(12) United States Patent
Cappiello

(10) Patent No.: US 6,570,652 B1
(45) Date of Patent: May 27, 2003

(54) ATHERMALIZATION AND PRESSURE DESENSITIZATION OF DIFFRACTION GRATING BASED SPECTROMETER DEVICES

(75) Inventor: Gregory G. Cappiello, Windham, NH (US)

(73) Assignee: Digital Lightwave, Inc., Clearwater, FL (US)

( * ) Notice: Subject to any disclaimer, the term of this patent is extended or adjusted under 35 U.S.C. 154(b) by 56 days.

(21) Appl. No.: 09/724,604

(22) Filed: Nov. 28, 2000

Related U.S. Application Data

(60) Provisional application No. 60/208,478, filed on Jun. 2, 2000, and provisional application No. 60/208,477, filed on Jun. 2, 2000.

(51) Int. Cl.[7] .................................................. G01J 3/28
(52) U.S. Cl. ....................................................... 356/328
(58) Field of Search ................................ 356/328, 731, 356/300–334

(56) References Cited

U.S. PATENT DOCUMENTS

| 4,718,056 A | 1/1988 | Schultheiss | 370/3 |
| 4,763,969 A | 8/1988 | Khoe et al. | 350/96.19 |

(List continued on next page.)

FOREIGN PATENT DOCUMENTS

| EP | 0123 237 A1 | 10/1984 |
| EP | 0727681 A2 | 8/1996 |
| EP | 1041411 A2 | 10/2000 |
| JP | 58009119 | 1/1983 |

(List continued on next page.)

OTHER PUBLICATIONS

Thomas H. Jamieson, "Thermal effects in optical systems", Optical Engineering, Mar./Apr. 1981, vol. 20, No. 2, pp. 156–160.

Robert E. Fischer, "Optical design for the infrared", Proc. of SPIE vol. 0531, Geometrical Optics, ed. Fischer, Price, Smith (Jan. 1985), pp. 81–119.

Michael Roberts, "Athermalisation of Infrared optics: a review", Proc. of SPIE vol. 1049, Recent Trends in Optical Systems Design and Computer Lens Design Workshop II, ed. R E Fischer, R C Juergens (Jun. 1989), pp. 55–64.

(List continued on next page.)

*Primary Examiner*—F. L. Evans
*Assistant Examiner*—Kara Geisel
(74) *Attorney, Agent, or Firm*—Jenkens & Gilchrist, P.C.

(57) ABSTRACT

A device for monitoring wavelength division multiplexed optical signals for use in an optical network and in an optical performance monitor. A device has a structure for supporting components of the device. An optical component is supported at one end of the structure for transmitting the optical signals. A diffraction grating is supported at an opposing end of the structure for diffracting the optical signals from the optical component. An optical sensor is supported in relation to the diffraction grating by the structure for monitoring the optical signals. A telephoto lens assembly is supported by the structure and disposed between the optical sensor and the diffraction grating, the lens assembly having a focal length for focusing the optical signals in relation to the optical sensor. Thermal effects on the structure are balanced against thermal effects on the lens assembly. A prism is disposed between the lens assembly and diffraction grating. The prism is configured to anamorphically compress the diffracted optical signals. Thermal effects on the diffraction grating are balanced against thermal effects on the lens and prism.

10 Claims, 6 Drawing Sheets

U.S. PATENT DOCUMENTS

| | | | |
|---|---|---|---|
| 5,035,495 A | 7/1991 | Toyoda et al. | 350/588 |
| 5,799,118 A | 8/1998 | Ogusu et al. | 385/14 |
| 5,991,482 A | 11/1999 | Laude | 385/37 |
| 6,008,492 A | 12/1999 | Slater et al. | 250/334 |
| 6,011,884 A | 1/2000 | Dueck et al. | 385/24 |
| 6,134,359 A | 10/2000 | Keyworth et al. | 385/33 |
| 6,147,341 A | 11/2000 | Lemaire et al. | 250/227.17 |
| 6,169,838 B1 | 1/2001 | He et al. | 385/129 |
| 6,307,657 B1 * | 10/2001 | Ford | 359/130 |
| 6,343,169 B1 | 1/2002 | Dempewolf et al. | 385/37 |

FOREIGN PATENT DOCUMENTS

| | | |
|---|---|---|
| JP | 06331850 | 2/1994 |
| JP | 6-331850 | 2/1994 |
| WO | WO01/20372 A2 | 3/2001 |

OTHER PUBLICATIONS

Russell M. Hudyma, "Athermal MWIR Objectives", Proc. of SPIE vol. 2540, Current Developments in Optical Design and Engineering V, ed. R E Fischer, W J Smith (Sep. 1995), pp. 229–235.

M. Olivieri, S. Pieri, A. Romoli, "Analysis of defocusing thermal effects in optical systems", Proc. of SPIE vol. 2774, Design and Engineering of Optical Systems, ed. J J Braat (Aug. 1996), pp. 283–292.

P.R. Hastings and D.M. Montgomery, "Support of Cooled Components in Astronomical Instruments", Cryogenics, IPC Science and Technology Press Ltd., vol. 33, No. 11, Nov. 1, 1993, pp. 1032–1036, XP000400118, Nov. 1, 1993; ISSN: 0011–2275, p. 1034.

U.S. patent application Ser. No. 09/724,638, Cappiello, filed Nov. 28, 2000.

U.S. patent application Ser. No. 09/724,770, Cappiello et al., filed Nov. 28, 2000.

U.S. patent application Ser. No. 09/724,771, Dueck et al., filed Nov. 20, 2000.

* cited by examiner

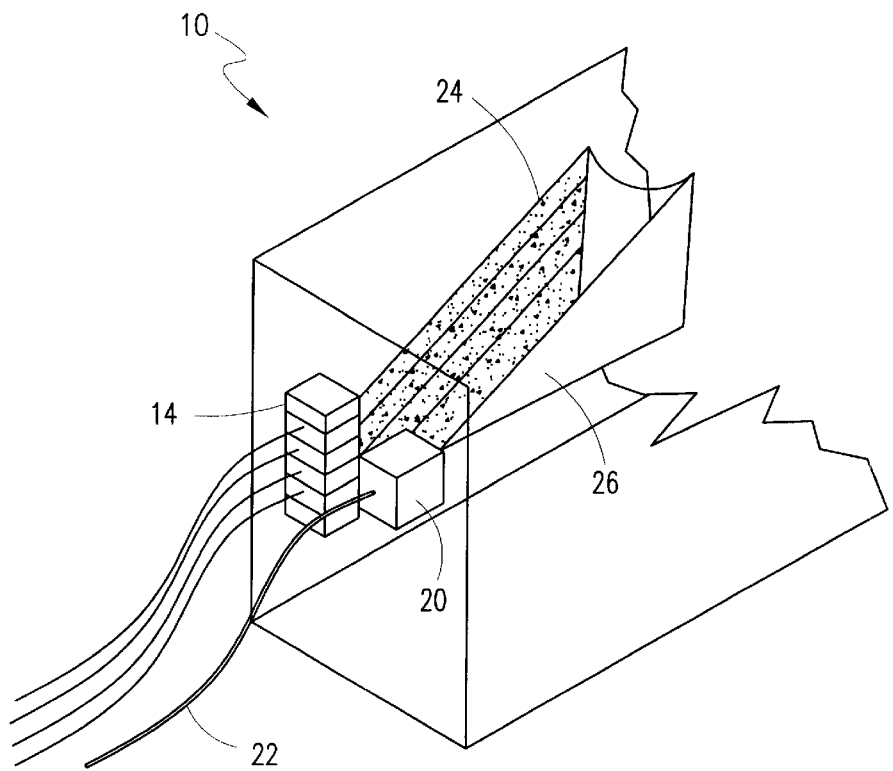
FIG. 3
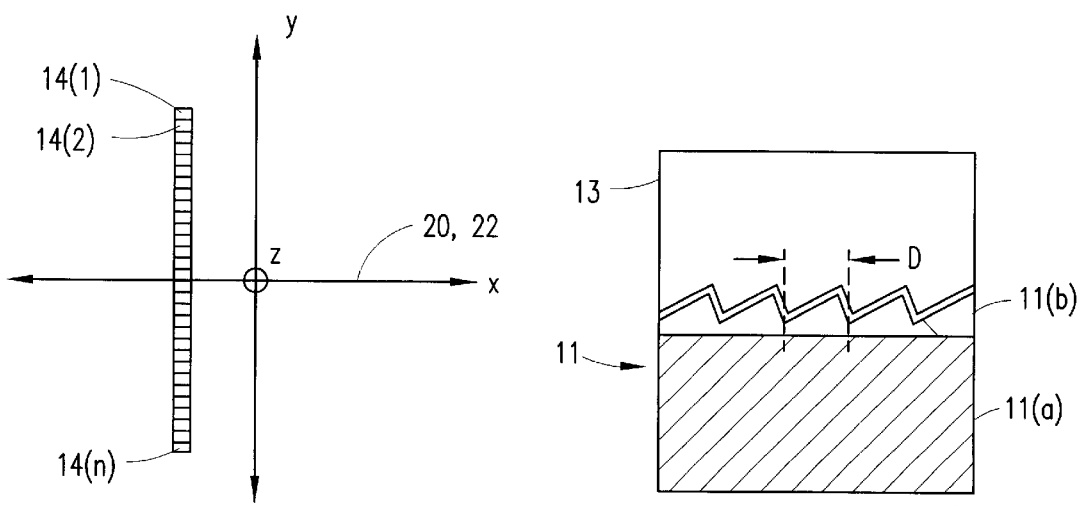
FIG. 4
FIG. 5

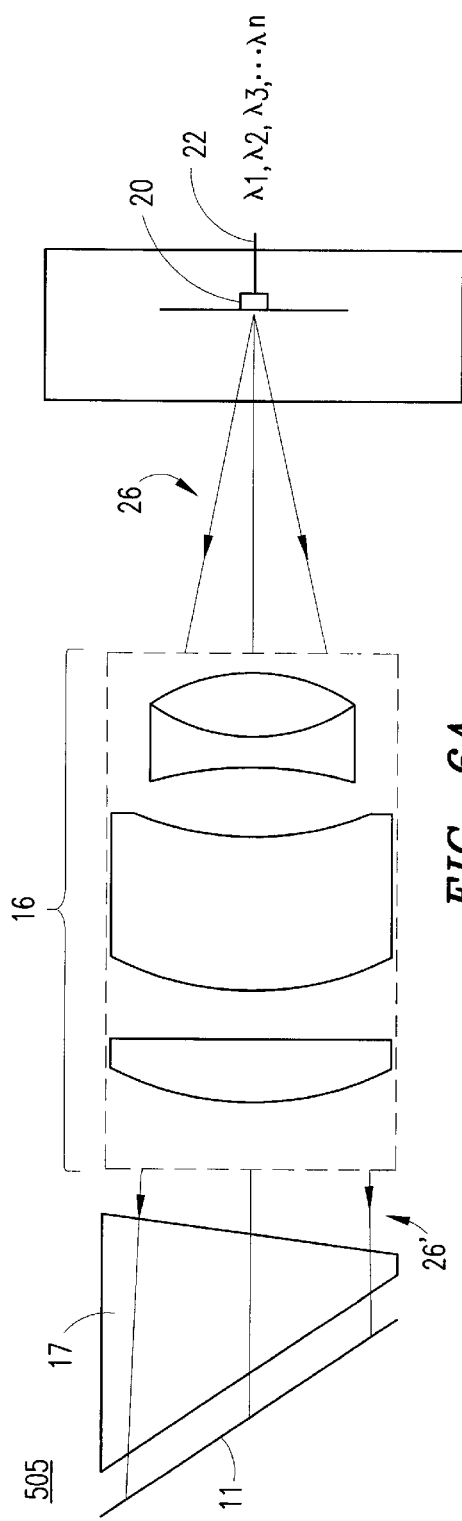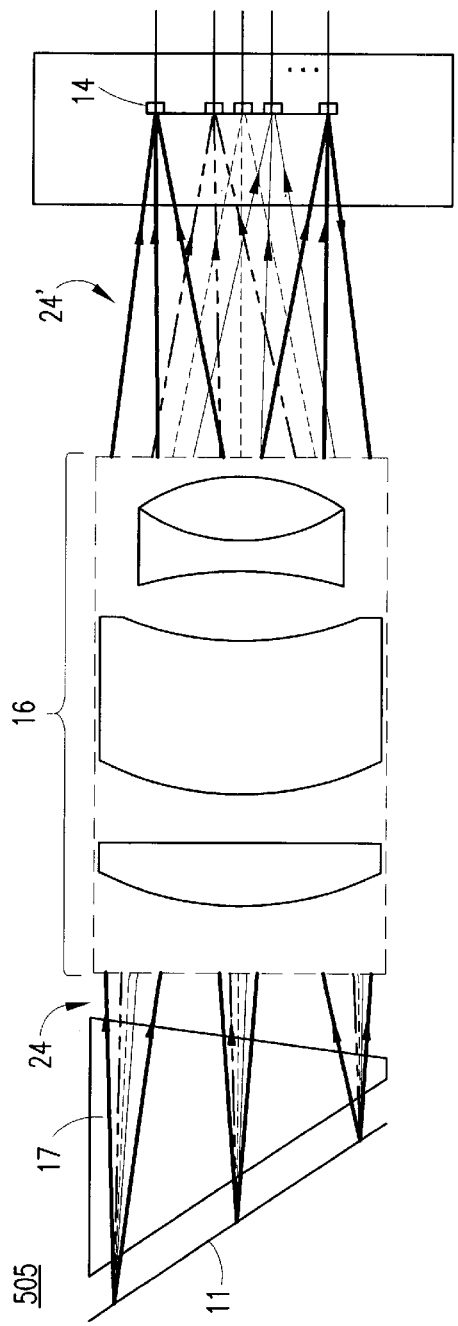

ATHERMALIZATION AND PRESSURE DESENSITIZATION OF DIFFRACTION GRATING BASED SPECTROMETER DEVICES

CROSS-REFERENCE TO RELATED APPLICATIONS

This patent application is related to and claims priority from U.S. Provisional Patent Application No. 60/208,477, filed Jun. 2, 2000, which is incorporated by reference herein in its entirety. This application is related to and claims priority from U.S. Provisional Patent Application No. 60/208,478, filed Jun. 2, 2000 which is incorporated by reference herein in its entirety. This application incorporates by reference U.S. Patent Application entitled Device and Method for Optical Performance Monitoring in an Optical Communications Network filed Nov. 28, 2000. This application incorporates by reference U.S. Patent Application entitled Optical Performance Monitor with Optimized Focus Spot Size filed Nov. 28, 2000.

FIELD OF THE INVENTION

The present invention relates generally to wavelength division multiplexed optical signals, and more particularly, to minimizing the thermal and pressure effects on diffraction grating based spectrometer systems incorporating wavelength division demultiplexing devices.

BACKGROUND OF THE INVENTION

The telecommunications industry has grown significantly in recent years due to developments in technology, including the Internet, e-mail, cellular telephones, and fax machines. These technologies have become affordable to the average consumer such that the volume of traffic on telecommunications networks has grown significantly. Furthermore, as the Internet has evolved, more sophisticated applications have increased data volume being communicated across telecommunications networks.

To accommodate the increased data volume, the telecommunications network infrastructure has been evolving to increase the bandwidth of the telecommunications network. Fiber optic networks that carry wavelength division multiplexed optical signals or channels provide for significantly increased data channels for the high volume of traffic. The wavelength division multiplexed optical channels or polychromatic optical signals comprises monochromatic optical signals. The wavelength division multiplexed optical channels carry time division multiplexed data containing information, including voice and data. Contemporary optical networks can include forty or more monochromatic optical channels on a single fiber and each monochromatic optical channel can carry many thousands of simultaneous telephone conversations or data transmissions, for example.

An important component of the fiber optic networks is an optical performance monitor (OPM) for monitoring the performance of the optical system. The OPM provides a system operator the ability to monitor the performance of the individual substantially monochromatic optical signals. The optical performance monitor may measure the following metrics: power level, center wavelength, optical signal-to-noise ration (OSNR), interference between channels such as crosstalk, and laser drift. By monitoring these metrics, the optical network operator can identify and correct problems in the optical network.

The OPM may include a dispersion engine and an optical sensor. The dispersion engine may include lenses and a dispersion device, such as a diffraction grating. The lenses process the polychromatic optical signal and cause the polychromatic optical signal to be incident to the dispersion device at a near-Littrow condition, which is a condition where the angle of the incident light beam is reflected back toward the source of the incident light beam near the incident angle at at least one wavelength. The dispersion device diffracts the polychromatic optical signal into its component substantially monochromatic optical signals, which are diffracted at angles as a function of the wavelength of each substantially monochromatic optical signal. Each substantially monochromatic optical signal forms a spot that is focused at distinct locations along the optical sensor.

Both the mechanical and optical components of the spectrometer are affected by changes in temperature. They expand and contract changing in relative position, and also changing in optical properties. Additionally, changes in pressure cause changes in optical properties of air within the spectrometer. These changes must be calibrated out or they will affect the quality of the information received from the spectrometer. Thus, it is desirable to minimize the effects of temperature and pressure on the spectrometer.

SUMMARY OF THE INVENTION

To overcome the adverse affects of changes in temperature and pressure a device for monitoring wavelength divisions multiplexed optical signals has been athermalized and desensitized to pressure. The device can also be part of an optical network. The device has a structure for supporting components of the device. An optical component is supported at one end of the structure for transmitting the optical signals. A diffraction grating is supported at an opposing end of the structure for diffracting the optical signals from the optical component. An optical sensor is supported in relation to the diffraction grating by the structure for monitoring the optical signals. A lens assembly is supported by the structure and disposed between the optical sensor and the diffraction grating. The lens assembly has a focal length for focusing the optical signals in relation to the optical sensor. The diffraction grating has an angular dispersion that changes with temperature and the focal length changes with temperature. The product of the focal length and angular dispersion remains substantially constant with temperature. Optionally, this can be calibrated with software and a temperature sensing system.

The spectrometer further includes a prism supported by the structure and disposed between the lens assembly and diffraction grating. The prism has an angular dispersion that changes with temperature. The product of the focal length and the sum of the angular dispersion of the prism and the angular dispersion of the grating remains substantially constant with temperature. The change in index of refraction with temperature of the prism is a value approximately equal to the negative value of the coefficient of thermal expansion of the diffraction grating. A change in index of refraction with temperature of the prism is substantially within 30% of a negative value of a coefficient of thermal expansion of the diffraction grating. The prism is configured to anamorphically compress the diffracted optical signals. A first prismatic region formed between the prism and the lens assembly is opposed to a second prismatic region formed between the prism and the diffraction grating. The first prismatic region has a first angle measured between the lens assembly and the prism and the second prismatic region has a second angle measured between the prism and the diffraction grating, the second angle being approximately equal to the first angle.

In an embodiment without a prism, the coefficient of thermal expansion of the diffraction grating is a value chosen to be approximately equal to a negative of the change in index of refraction with temperature of air. In this case, the diffraction grating has a coefficient of thermal expansion of approximately 0.5 PPM/degree Celsius to 1.5 PPM/degree Celsius.

The lens assembly is constructed of a material chosen to minimize its variance in focal length over temperature. The assembly comprises a telephoto lens. A coefficient of thermal expansion of the structure and a change in index of refraction with temperature of the lens assembly are values selected so that a length of the structure changes substantially proportionally with the focal length of the lens assembly in response to temperature changes, whereby the lens assembly remains substantially focused in relation to the optical sensor.

BRIEF DESCRIPTION OF THE DRAWINGS

A more complete understanding of the system and method of the present invention may be obtained by reference to the following Detailed Description when taken in conjunction with the accompanying Drawings wherein:

FIG. 3 is a perspective view of a portion of the spectrometer device of FIG. 2;

FIG. 4 is an end view of the portion of the spectrometer device of FIG. 2;

FIG. 5 illustrates a general construction of a diffraction grating assembly;

FIGS. 6A–6B illustrate multiplexing and demultiplexing functions of a wave division multiplexing/demultiplexing device;

DETAILED DESCRIPTION OF EXEMPLARY EMBODIMENTS

The present invention will now be described more fully hereinafter with reference to the accompanying drawings in which a preferred embodiment of the invention is shown.

Optical networks are utilized to handle telecommunications traffic caused in part by the Internet, mobile communications, and facsimile communications. To increase the bandwidth of optical networks, multiple channels are multiplexed into a single fiber optic line through wavelength division multiplexing. A wavelength division multiplexer/demultiplexer (WDM) is utilized to join a multiple number of substantially monochromatic optical signals into a polychromatic optical signal in the multiplexing case, and separate a polychromatic optical signal into a multiple number of substantially monochromatic optical signals in the demultiplexing case. A monochromatic optical signal is defined as being a narrowband optical signal. Characteristics, such as wavelength and signal power, and signal to noise ratio of each multiplexed optical signal in a polychromatic line are monitored with an optical performance monitor (OPM) or spectrometer.

Figure 1:
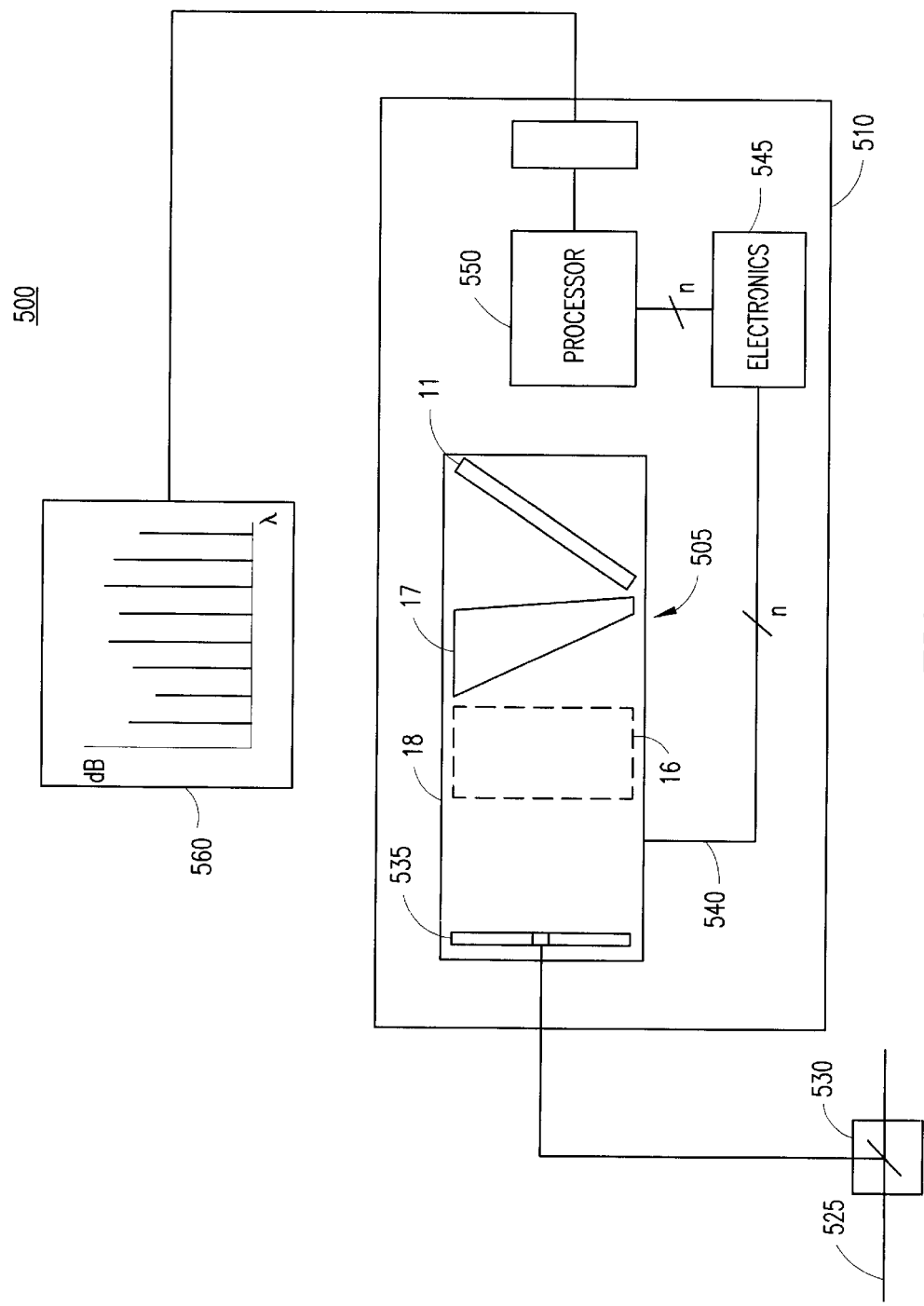
FIG. 1 is a block diagram of an optical performance monitoring system.

FIG. 1 is a block diagram of a system 500 having a spectrometer 505 used to measure and display power of substantially monochromatic optical signals as combined into a polychromatic optical signal traveling through a fiber optic line 525. An optical beam splitter 530 is used to extract a percentage of the polychromatic optical signal from the fiber optic line 525 and direct the extracted polychromatic optical signal to the spectrometer 505. Spectrometer 505 operates to demultiplex the polychromatic optical signal into its constituent substantially monochromatic signals and monitoring each, as is described below with reference to FIGS. 6A and 6B.

Figure 2:
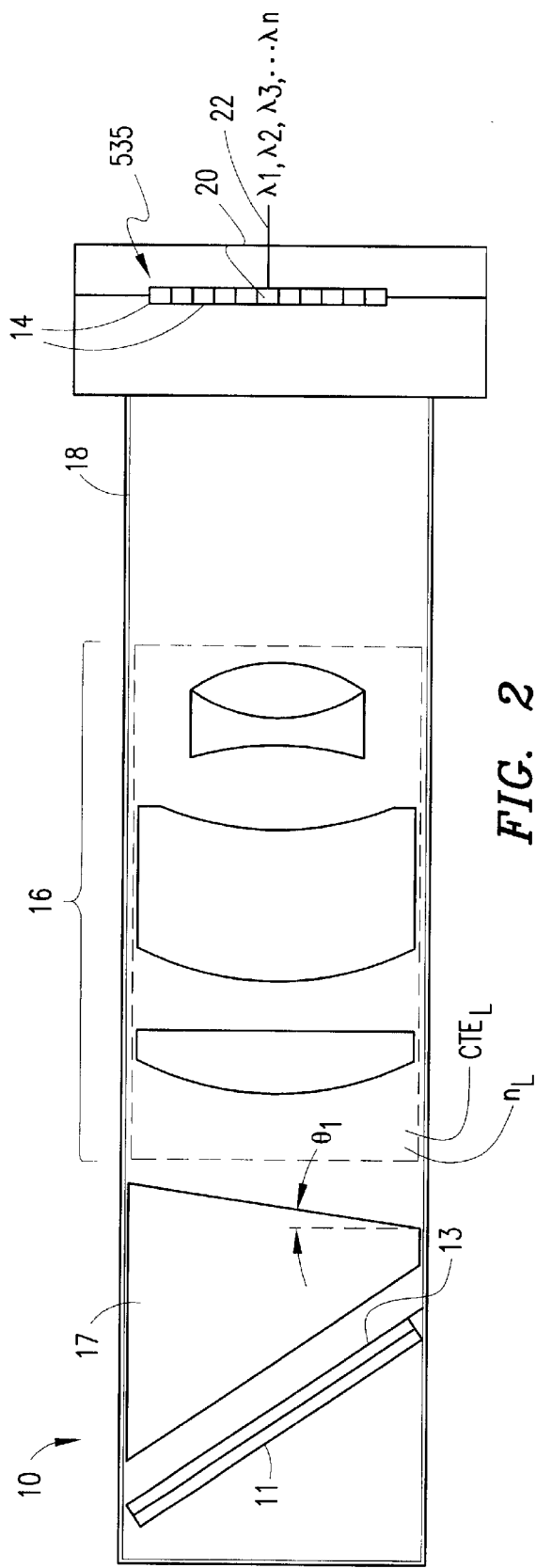
FIG. 2 is a side elevational view of a spectrometer device according to an embodiment of the present invention.

Referring to FIG. 2, there is shown a side view of a preferred embodiment of a spectrometer 10 in accordance with the present invention. The spectrometer 10 comprises a plurality of optical sensors 14, a collimating/focusing lens 16 assembly, a prism 17, reflective diffraction grating assembly 11, a coupling component 20, and a corresponding input optical fiber 22. All of the above-identified components of the spectrometer 10 are disposed along an optical axis X—X of the spectrometer 10, as will be described in more detail below.

Optical sensors 14 are sensors used for monitoring characteristics -of the optical signal, and may be any device, for example a photo-diode, capable of monitoring the desired characteristics. Sensors 14 are grouped into a one-dimensional sensor array (i.e., a 1×n array), and an end portion of the input optical fiber 22 is secured to the output fiber coupling component 20. Coupling component 20 is used for purposes of optical fiber securement, ease of optical fiber handling and precision optical fiber placement within spectrometer 10. Coupling component 20 may be, for example, a silicon V-groove assembly wherein the optical fiber 22 is sealed and-aligned in a V-shaped groove formed in a silicon structure.

Referring to FIG. 3, there is shown a perspective end view of a portion of the spectrometer 10 depicting the one-dimensional sensor array (a 1×4 array), and how the single optical fiber 22 is secured to the coupling component 20.

As shown in FIG. 4, the optical sensors 14 and the input fiber 22 are disposed offset from, but symmetrically about, the optical axis X—X of the spectrometer 10 so as to avoid signal interference between a polychromatic optical beam 26 and a substantially monochromatic optical beam 24 appearing on or directed to any of the plurality of the optical sensors 11, or anywhere else. This offset spacing of the optical sensor array 14 from the coupling component 20 is determined based upon the characteristics of diffraction grating assembly 11, the wavelengths of each of the substantially monochromatic optical beams 24, and the focusing power of lens assembly 16.

Lens assembly 16 (FIG. 2) is adapted to collimate substantially monochromatic optical beams 24 incident thereon. Lens assembly 16 has a relatively high level of transmission efficiency. The lens assembly may include a plano-convex homogeneous refractive index collimating/focusing lens assembly. Each lens in the lens assembly 16 may utilize a refraction glass material having a high index of refraction to insure efficient optic beam transmissions. It is preferable that lens assembly 16 used in modified WDM 505 (ex. spectrometer 10) have telephoto characteristics. Use of a telephoto lens assembly 16 or a telephoto lens in assembly is advantageous, because lens assembly 16 can be smaller than would otherwise be required to achieve the same focal length. Alternatively, the lens assembly 16 may include other lens types, lens numbers, lens configurations and lens compositions. In cases where diffraction grating assembly 11 is concave or otherwise non-planar, the use of lens assembly 16 within spectrometer 10 may be unnecessary.

Referring to FIG. 5, there is shown a cross-sectional view of a diffraction grating assembly 11 for use in the present invention. Diffraction grating assembly 11 is a reflective grating for reflecting optical and/or light rays diffracted therefrom. The grating assembly 11 comprises a substrate 11(a) covered by a diffractive surface 11(b). The diffractive surface 11(b) may be metallic, for example, aluminum or gold. Optionally, an optically transmissive material or coating 13 covers diffractive surface 11(b). Substrate 11(a) may be constructed from a number of different substances. For example, substrate 11(a) may be a glass compound. As seen in FIG. 2, substrate 11(a) may have a substantially planar shape. It is understood, however, that substrate 11(a) may alternately include a substantially curved or concave surface (not shown) over which a diffraction grating surface is formed. Generally, as substrate 11(a) is a substantial portion of grating assembly 11, its thermal properties dominate.

It is understood that although diffraction grating assembly 11 may be associated with and/or included in passive devices and networks, that diffraction grating assembly 11 may also be utilized in devices and networks having active components which may perform one or more of a variety of active functions, including optical amplification.

A prism 17 may optionally be disposed between lens assembly 16 and diffraction grating assembly 11. Prism 17 bends optical signals from lens assembly 16 towards diffraction grating assembly 11. In doing so, prism 17 allows diffraction grating assembly 11 to be angularly disposed within a housing 18 of spectrometer 10, as shown in FIG. 2. Prism 17 may be in direct contact with material 13 of diffraction grating assembly 11 (FIG. 4), or spaced therefrom. It is preferable that prism 17 be spaced from lens assembly 16. It is also preferable that prism 17 have a front angle ($\theta_1$ in FIG. 2), as discussed in more detail below, configured to increase the angle between reflected substantially monochromatic beams by anamorphic beam compression. More than one prism 17 can be provided depending on the configuration of spectrometer 10. It is understood, however, that spectrometer 10 may be utilized without prism 17.

Referring again to FIG. 2, diffraction grating assembly 11, prism 17, lens assembly 16, optical sensors 14, and coupling component 20 with input fiber 22 are held in relation along axis X—X by a housing 18. In the preferred embodiment, housing 18 is a rectangular box structure and is sized to closely receive grating assembly 11, prism 17, and lens assembly 16. It will be readily appreciated that housing 18 can be any other shape or structure, for example a tube, which conveniently holds the components. It will also be appreciated that housing 18 could alternately be a flat plate which supports the components.

The operation of spectrometer 10 will be described with reference to FIGS. 6A–6B. Spectrometer 10 generally receives a single polychromatic input signal or beam 26, generates a plurality of individual substantially monochromatic signals or beams 24 at different wavelengths from the single polychromatic input signal 26, and those beams are projected onto sensors 14 to monitor the signal.

A single polychromatic optical input beam 26 is transmitted along and emitted from input optical fiber 22 into the air space between the coupling component 20 and the lens assembly 16. Within this air space, the polychromatic optical input beam 26 is expanded in diameter (best seen in FIG. 3) until it becomes incident upon the lens assembly 16. The lens assembly 16 focuses the polychromatic optical input beam 26 towards diffraction grating assembly 11 as polychromatic optical beam 26' (FIG. 6A).

As stated above, diffraction grating assembly 11 operates to angularly diffract the polychromatic optical beam 26' into a plurality of substantially monochromatic optical beams 24, with each reflected substantially monochromatic beam 24 being diffracted at a distinct angle, relative to diffraction grating assembly 11, by an amount that is dependent upon the wavelength of the reflected substantially monochromatic beam 24. As shown in FIG. 6B, the diffraction grating assembly 11 reflects the substantially monochromatic signals 24 back towards the lens assembly 16. The lens assembly 16 collimates the plurality of substantially monochromatic optical input beams 24, and then transmits each collimated, substantially monochromatic optical beam 24' to the corresponding optical sensor 14. Each substantially monochromatic optical beam 24' becomes incident upon a corresponding optical sensor 12.

Referring to FIG. 1, the sensor array 535 outputs signals onto a bus 540 representative of the measured power for each substantially monochromatic optical signal focused on the sensor array 535. Electronics 545 process and/or convert the output signals of the sensor array 535 and communicate the processed signals to the processor 550 for further processing. The processor 550 communicates the further processed signals to a display driver, which drives a display 560 so that the power levels for each substantially monochromatic optical signal can be displayed for a network operator to visually inspect. The display 560 can display the power levels in power (dB) at each wavelength ($\lambda$), for example.

The embodiment of the system 500 as shown is meant only to show the functionality of the system 500. It should be understood that the spectrometer 505 may have alternate optical components to perform the same functions.

Both the mechanical and optical components of spectrometer 10 are affected by changes in temperature. The materials expand and contract changing the relative position of components and changing optical properties of the system. This negatively impacts the ability of spectrometer 10 to efficiently demultiplex and monitor an optical signal, because it changes the intended path and focus of beams 24 and 26. Therefore, to ensure accurate and efficient signal monitoring with spectrometer 10, the thermal effects on components within spectrometer 10 are balanced.

To achieve maximum efficiency, each substantially monochromatic beam 24 is focused and centered on its respective corresponding optical sensor 14. The distance between each beam 24 as it is projected on the end of its respective corresponding fiber 12 is herein referred to as "lateral spot separation". Thus, to be centered on sensors 14, the lateral spot separation of beams 24 must match the spacing of sensors 14.

Lens assembly 16 expands and contracts with temperature changing its optical properties. The index of refraction, and thus focal length, changes with temperature, tending to shift the focus, or focal plane, axially and substantially parallel to X—X away from the sensor array 14. Also, as the index of refraction changes, the magnification of beams 24 changes, affecting the spot separation. As the magnification increases, the spot separation increases causing beams 24 to expand laterally (lateral expansion) on the sensors 14. As the magnification decreases, the spot separation decreases, also causing movements (lateral contraction).

The change in optical properties of lens assembly 16 is compounded by the dimensional change of housing 18 with temperature. Housing 18 expands and contracts along axis X—X with temperature, which changes the relative distance between the sensor array 14 and lens assembly 16. This moves sensor array 14 axially from the focal plane.

The index of refraction of the air ($n_a$) between grating assembly 11 and lens assembly 16, and index of refraction of prism 17 ($n_p$), if included, changes with temperature. This too, affects the average lateral spot position as refraction of the substantially monochromatic beams 24 changes.

Substrate 11(a) of grating assembly 11 expands and contracts with changes in temperature and affects the average lateral spot position. As substrate 11(a) expands, the number of diffraction surfaces per unit length, or grating period (D), decreases. As the grating period (D) decreases, the angle between diffracted substantially monochromatic beams 24, or angular dispersion, decreases. This can also be quantified in terms of linear dispersion, which is the product of angular dispersion and focal length. As the angular and thus linear dispersion decreases, the lateral spot separation decreases moving laterally on sensor array 14.

Concerning the thermal effects on lens assembly 16, the change of refractive index can be quantified in terms of change in optical power with temperature. In an embodiment of lens assembly 16 having a single thin lens element of optical power ($\phi$), the change in power with temperature (t) is given by:

$$\frac{d\varphi}{dt} = \varphi\left[\frac{\frac{dn}{dt}}{n-1} - CTE_L\right] = \varphi T \quad (1)$$

where $CTE_L$ is the coefficient of thermal expansion of the lens material and n is the refractive index of the lens in lens assembly 16.

The analysis can be applied to embodiments of lens assembly 16 having multiple lens elements. For a system of two lenses with separation d, the total optical power ($\phi_T$) is given by:

$$\phi_T = \phi_1 + \phi_2 - d\phi_1\phi_2 \quad (2)$$

Accounting for change in temperature, equation 2 becomes:

$$\frac{d\varphi_T}{dt} = [T_1\varphi_1 + T_2\varphi_2 - d(CTE_D)T_1\varphi_1 T_2\varphi_2]\Delta t \quad (3)$$

where $CTE_D$ is the coefficient of thermal expansion of a spacer element (not shown) between lens elements, and where T is the quantity in brackets in equation (1). One skilled in the art will understand that this analysis can be expanded to apply to various combinations of thin lenses.

Optionally, the material of lens assembly 16 can be chosen with a relatively low change in refractive index with temperature (dn/dt), herein also referred to as coefficient of refractive index change, to minimize movement in focal plane with temperature.

The material of housing 18 and lens assembly 16 are chosen so that the expansion or contraction of housing 18 compensates as much as possible for axial shift in focal plane. In other words, a length of housing 18 between lens assembly 16 and sensor array 14 changes substantially the same amount as the change in focal length of lens assembly 16 with temperature. Expressed mathematically:

$$CTE_M L \cong \Delta z \quad (4)$$

where $CTE_M$ is the expansion coefficient of housing 18, L is the length housing 18 between lens assembly 16 and sensor array 14, and $\Delta z$ is the axial change in position of the focal plane. For a single lens:

$$\Delta z = \frac{1}{T\varphi} \quad (5)$$

One skilled in the art will understand that this can be expanded to apply to multiple lens systems by applying the same analysis as applied above.

Concerning the thermal effects on grating assembly 11, the dispersive properties of grating 10 change as substrate 11(a) expands and contracts with temperature. As substrate 11(a) expands and contracts, the angular dispersion, and thus linear dispersion, of reflected substantially monochromatic beams 24 changes affecting the lateral spot position. The change in dispersion causes a lateral shift in the central wavelength of the substantially monochromatic beams 24 as seen by sensors 14, requiring calibration of the sensor array 14 with temperature so that the central wavelength is still monitored.

Angular dispersion at Littrow is shown by the following equation:

$$\frac{d\angle}{d\lambda} = \frac{m}{2n_c D\cos(\theta)} \quad (6)$$

where $d\angle/d\lambda$ is the angular dispersion in radians per wavelength, m is the diffraction order, $n_c$ is the refractive index of coating 13, D is the grating period, and $\theta$ is the Littrow angle of the diffraction grating. As described above, D changes with temperature as substrate 11(a) expands and contracts, and thus the angular dispersion changes.

Linear dispersion is the product of the angular dispersion and effective focal length, and focal length is the inverse optical power, hence:

$$LD = \frac{\frac{d\angle}{d\lambda}}{\varphi_T} \quad (7)$$

Therefore, linear dispersion and, correspondingly, lateral spot separation changes with temperature.

Optionally, to minimize changes in lateral spot separation and linear dispersion resulting from geometrical changes in substrate 11(a), lens assembly 16 can be configured to substantially compensate, and hold linear dispersion substantially constant, with its change in focal length. Thus, as angular dispersion of grating assembly 11 increases, focal length of lens assembly 16 decreases accordingly, and as angular dispersion decreases, focal length increases to keep linear dispersion substantially constant.

Figure 7:
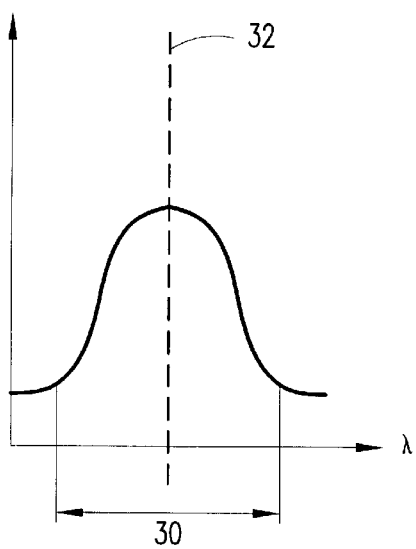
FIG. 7 illustrates a pass band and central wavelength of a monochromatic beam.

Referring to FIG. 7, in practice, substantially monochromatic beams 24 are not truly monochromatic, but rather a tight range of wavelengths. Each beam 24 is has a central wavelength 32 which is the representative wavelength to which an optical signal is associated. Each central wavelength 32 is generally predefined, and may correspond with an industry standard, such as the standards set by the International Telecommunication Union. As temperature changes the dispersion of grating assembly 11, beam 24 is no longer reflected in accordance with the Littrow and near-Littrow condition discussed above, and the position of the central wavelength of a beam 24 shifts laterally on sensors 14.

The index of refraction of prism 17, or the air between lens assembly 16 and grating assembly 11 if no prism 17 is present, changes with temperature. This can be balanced with the thermal effects of substrate 11(a). The change with temperature of the angular deviation of a beam incident on grating assembly 11 through a prism 17 can be approximated by:

$$\frac{d\Delta}{dt} = \frac{-m\lambda}{[2n_p D[1 + (G + C)\Delta t]^2]}(G + C) \quad (8)$$

where G is the change in refractive index of the prism ($n_p$) over temperature range $\Delta t$, C is the product of the grating substrate 11(a) coefficient of thermal expansion and $\Delta t$, and $n_p$ is the index of refraction of the prism.

To minimize the thermal effects of substrate 11(a), materials of prism 17 and diffraction grating substrate 11(a) are chosen so that the change in refractive index of prism 17 with temperature and the coefficient of thermal expansion of grating substrate 11(a) sum close to zero. This minimizes the deviation from Littrow and near-Littrow condition with temperature, and thus minimizes the lateral shift in center channel wavelength.

It has been found that by choosing the material of prism 17 to have a negative change in index of refraction with temperature approximately equal to the coefficient of thermal expansion of substrate 11(a), and preferably within a magnitude substantially within 30% of the coefficient of thermal expansion of substrate 11(a), best results are achieved.

When no prism 17 is used, a change in index of refraction of air with temperature is balanced with the expansion and contraction of substrate 11(a). The substrate material is chosen such that its coefficient of thermal expansion and the change in index of refraction of air with temperature sum close to zero. In an ideal case, substrate 11(a) has a coefficient of thermal expansion equal to a negative of the change in index of refraction of air. It has been found that by choosing the material of substrate 11(a) to have a coefficient of thermal expansion approximately between 0.5 PPM/° C. and 1.5 PPM/° C., best results are achieved.

Variations in pressure can affect the path of beams 24 and 26 much in the same way as temperature discussed above. The most notable effect is the change in index of refraction of air, especially between grating assembly 11 and lens assembly 16, with pressure. Prismatic triangular regions of air within spectrometer 10 act as "air prisms" to refract beams 24 and 26. As pressure varies, the refractive index of air changes and affects how beams 24 and 26 are refracted, thus causing lateral shifts in the position of the center channel wavelength on sensor array 14.

Figure 8:
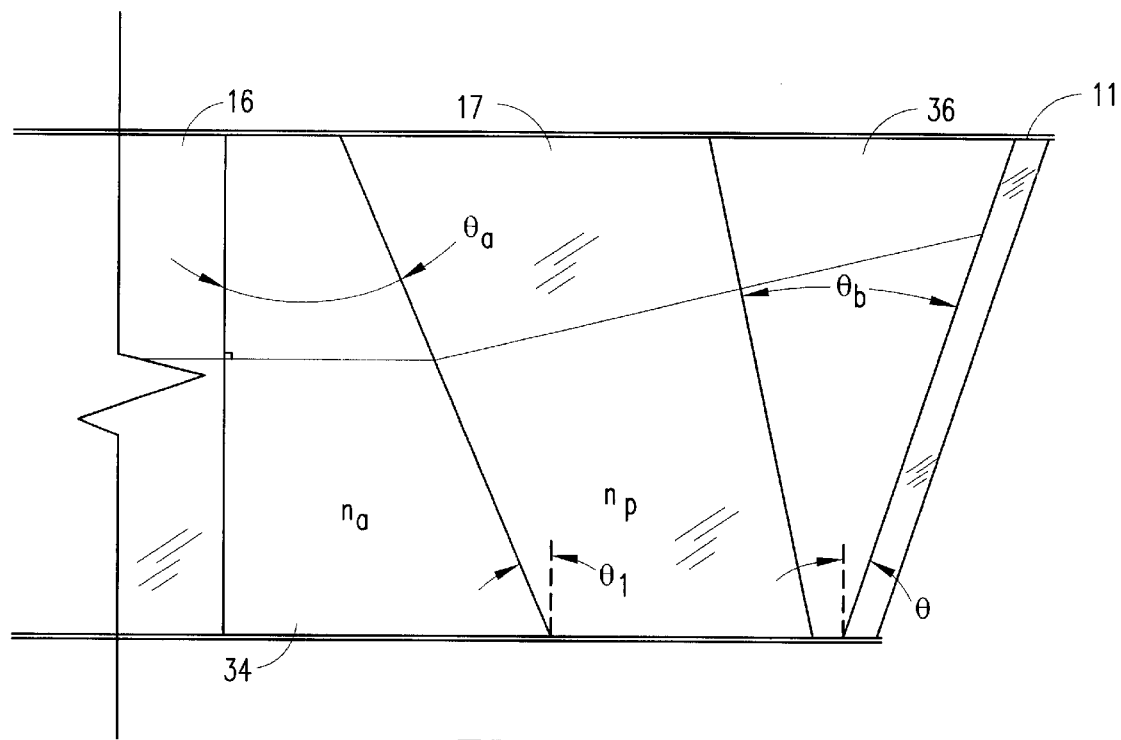
FIG. 8 illustrates the geometry of a prism.

Referring to FIG. 8, a prism or prisms 17 may be provided which form a prismatic region of air 34, between prism 17 and lens assembly 16 that substantially balances the refraction of a corresponding prismatic region of air 36 between prism 17 and diffraction grating 11. An angle ($\theta_a$) of air prism 34, measured between prism 17 and lens assembly 16, is approximately equal to an angle ($\theta_b$) of air prism 36, measured between prism 17 and grating assembly 11. However, angles $\theta_a$ and $\theta_b$ are directed in opposite directions, so that air prisms 34 and 36 are opposed as depicted in FIG. 8. This forms opposing air prisms 34 and 36, in which the refraction of one balances the refraction of the other. As pressure changes the index of refraction of the air, the change in refraction of one air prism 34 balances the change in refraction of the other 36.

It is preferable that prism 17 also be configured to create anamorphic beam compression of substantially monochromatic beams 24 toward sensors 14. The anamorphic beam compression decreases the diameter of beams 24, and thus increases the angular deviation between beams. This increased angular deviation creates additional beam separation at sensors 14 for a given structure 18 length. Thus, a desired beam separation can be achieved in a shorter overall length of spectrometer 10, enabling spectrometer 10 to be compact.

Referring to FIG. 8, the anamorphic beam compression is accomplished by providing a prism 17 or prisms configured to maximize the compression. The angular magnification factor is given by:

$$M = \frac{\sqrt{1 - \left(\frac{n_a}{n_p}\sin(\theta_1)\right)^2}}{\cos(\theta_1)} \quad (9)$$

where $n_a$ is the index of refraction of air and $\theta_1$ is the front prism angle. Thus, $\theta_1$ and $n_p$ are optimized, taking into account other factors discussed above, to maximize the anamorphic beam compression.

Figure 9:
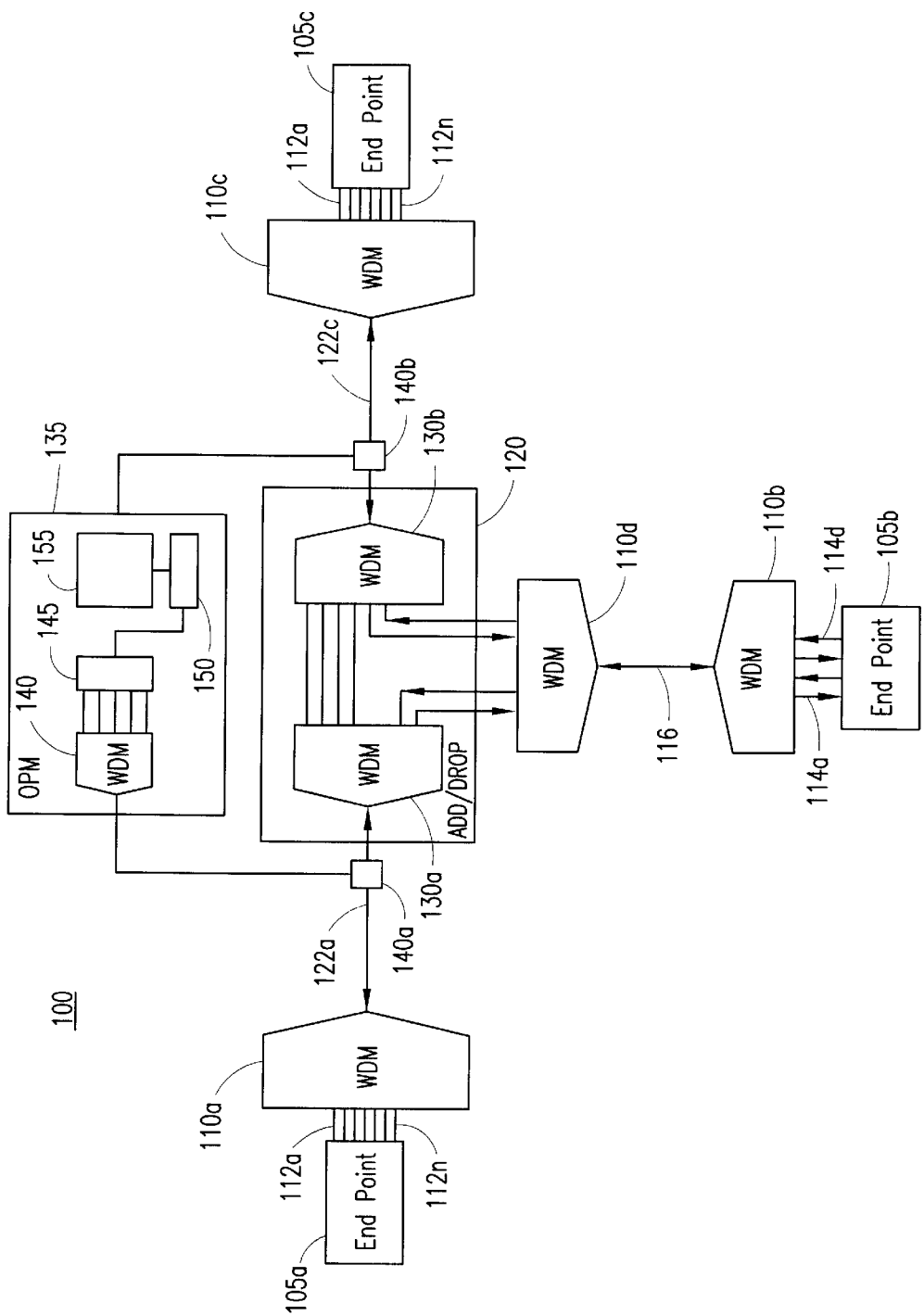
FIG. 9 is a block diagram of an optical communications system according to an embodiment of the present invention.

FIG. 9 is a block diagram of a fiber optic network 100 in accordance with an embodiment of the present invention. The fiber optic network 100 provides optical communication between end points 105a, 105b, and 105c. Each end point 105a, 105b, and 105c is coupled to a WDM 110a, 110b, and 110c, respectively, either optically or electrically. In the case of an optical coupling, each end point 105a and 105c communicates a multiple number of substantially monochromatic optical signals via fiber optic lines 112a–112n to the associated WDM 110a–110c, respectively. The end point 105b communicates a multiple number of substantially monochromatic optical signals via fiber optic lines 114a–114d to/from WDM 110b, which multiplexes the substantially monochromatic optical signals 114b, 114d to WDM 110d along fiber optic line 116.

The WDMs 110a and 110c are coupled via a wavelength add/drop device 120 between the fiber optic lines 122a and 122c, respectively. The wavelength add/drop device 120 is, in general terms, a simple form of a wavelength router with two input/output (I/O) ports and an additional third port wherein substantially monochromatic optical signals are added to/dropped from the incoming polychromatic optical signal appearing at either I/O port. Within the wavelength add/drop device 120, a pair of WDMs 130a–130b are utilized to separate a received polychromatic optical signal into a plurality of substantially monochromatic optical signals and communicate one or more of the substantially monochromatic optical signals to end point 105b, via the WDM 110d.

Optical performance monitor (OPM) 135 is further coupled to fiber optic lines 122a and 122c. Alternatively, the OPM 135 may be coupled to an individual fiber optic line. A polychromatic optical signal being monitored is tapped or extracted from the fiber optic line 122a, for example, via a beam splitter 140a, as is well known in the art. The beam splitter 140a may tap as little as 1% or less of the power of the monitored polychromatic signal to allow the OPM 135 to properly operate and provide the operator of the fiber optic network 100 valuable operating information, without substantially affecting the power level of the monitored polychromatic signal.

It is understood that beam splitter 140b may be utilized to tap a polychromatic signal appearing on fiber optic line 122c, and provide the tapped polychromatic signal to WDM 140.

As an example of how the fiber optic network 100 operates, the end point 105a may be located in Boston, the end point 105b may be located in Hartford, and the end point 105c may be located in New York City. A network service provider in Boston receives communication signals from local towns or cities via a communication system, such as a standard telephone network. The communication signals, which are destined to locations south of Boston (i.e., Hartford and New York City), are time-division multiplexed onto substantially monochromatic optical signals and delivered to the WDM 110a. The WDM 110a performs a wave division multiplexing operation on the substantially monochromatic optical signals and the resulting polychromatic optical signal is transmitted onto the fiber optic network 100 via the fiber optic line 122a. Upon the polychromatic optical signal reaching a network service provider between Boston and Hartford at add/drop device 120, the polychromatic optical signal is demultiplexed by the WDM 130a in the wavelength add/drop device 120. The substantially monochromatic optical signals that are destined for New York City may be re-multiplexed by the WDM 130b and sent to New York City along fiber optic line 122c. The substantially monochromatic signals destined for Hartford, on the other hand, may be multiplexed with other substantially monochromatic signals (having different wavelengths) at WDM 110d and delivered to the end point 105b in Hartford.

In addition, local communication signals originating from Hartford may be added to either WDM 130a or 130b to be transmitted to either Boston or New York City, respectively, based upon the optical frequency that the communication signals are placed. The substantially monochromatic optical signals are multiplexed by WDM 130b into a polychromatic optical signal and demultiplexed by WDM 110c in New York City. It should be understood that the fiber optic lines (e.g., 112a, 122a, 116, 122c) are bidirectional such that optical communication can be performed in either direction. The network service provider associated with add/drop device 120 additionally may monitor the system performance (e.g., channel power) using the OPM 135 to ensure system quality.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A device for monitoring wavelength division multiplexed optical signals, comprising:
   a structure for supporting components of the device;
   an optical component supported at one end of the structure for transmitting the optical signals;
   a diffraction grating supported at an opposing end of the structure for diffracting the optical signals from the optical component;
   an optical sensor supported in relation to the diffraction grating by the structure for monitoring the optical signals;
   a lens assembly supported by the structure and disposed between the optical sensor and the diffraction grating, the lens assembly having a focal length for focusing the optical signals in relation to the optical sensor; and
   wherein the coefficient of thermal expansion of the diffraction grating is a value chosen to be approximately equal to a negative of a change of index of refraction of air with temperature.

2. The device of claim 1 wherein the diffraction grating has a coefficient of thermal expansion, of approximately 0.5 PPM/degree Celsius to 1.5 PPM/degree Celsius.

3. The device of claim 1 wherein the lens assembly is constructed of a material chosen to minimize its variance in focal length over temperature.

4. The device of claim 1 wherein the lens assembly comprises a telephoto lens.

5. The device of claim 1 wherein a coefficient of thermal expansion of the structure and a change in index of refraction with temperature of the lens assembly are values selected so that a length of the structure changes substantially proportionally with the focal length of the lens assembly in response to temperature changes, whereby the lens assembly remains substantially focused in relation to the optical sensor.

6. An optical network having a device for monitoring wavelength division multiplexed optical signals, comprising:
   a structure for supporting components of the device;
   an optical component supported at one end of the structure for transmitting the optical signals;
   a diffraction grating supported at an opposing end of the structure for diffracting the optical signals from the optical component;
   an optical sensor supported in relation to the diffraction grating by the structure for monitoring the optical signals;
   a lens assembly supported by the structure and disposed between the optical sensor and the diffraction grating, the lens assembly having a focal length for focusing the optical signals in relation to the optical sensor; and
   wherein the coefficient of thermal expansion of the diffraction grating is a value chosen to be approximately equal to a negative of a change of index of refraction of air with temperature.

7. The network of claim 6 wherein the diffraction grating has a coefficient of thermal expansion of approximately 0.5 PPM/degree Celsius to 1.5 PPM/degree Celsius.

8. The network of claim 6 wherein the lens assembly is constructed of a material chosen to minimize its variance in focal length over temperature.

9. The network of claim 6 wherein the lens assembly comprises a telephoto lens.

10. The network of claim 6 wherein a coefficient of thermal expansion of the structure and a change in index of refraction with temperature of the lens assembly are values selected so that a length of the structure changes substantially proportionally with the focal length of the lens assembly in response to temperature changes, whereby the lens assembly remains substantially focused in relation to the optical sensor.

* * * * *